United States Patent
Tetsui (10) Patent No.: US 11,920,219 B2
(45) Date of Patent: Mar. 5, 2024

(54) HOT-FORGED TIAL-BASED ALLOY, METHOD FOR PRODUCING SAME, AND USES FOR SAME

(71) Applicant: National Institute for Materials Science, Tsukuba (JP)

(72) Inventor: Toshimitsu Tetsui, Tsukuba (JP)

(73) Assignee: National Institute for Materials Science, Tsukuba (JP)

(*) Notice: Subject to any disclaimer, the term of this patent is extended or adjusted under 35 U.S.C. 154(b) by 172 days.

(21) Appl. No.: 17/311,866

(22) PCT Filed: Dec. 13, 2019

(86) PCT No.: PCT/JP2019/048925
§ 371 (c)(1),
(2) Date: Jun. 8, 2021

(87) PCT Pub. No.: WO2020/129840
PCT Pub. Date: Jun. 25, 2020

(65) Prior Publication Data
US 2022/0017994 A1    Jan. 20, 2022

(30) Foreign Application Priority Data
Dec. 21, 2018    (JP) ................. 2018-238989

(51) Int. Cl.
*C22C 14/00*    (2006.01)
*B23P 15/02*    (2006.01)
*C22F 1/18*    (2006.01)

(52) U.S. Cl.
CPC .............. *C22C 14/00* (2013.01); *B23P 15/02* (2013.01); *C22F 1/183* (2013.01)

(58) Field of Classification Search
CPC .......... B23P 15/02; C22C 14/00; C22F 1/183; F01D 5/28; F02B 39/00; F05D 2300/174; F05D 2300/608
(Continued)

(56) References Cited

U.S. PATENT DOCUMENTS

| | | | |
|---|---|---|---|
| 5,232,661 A * | 8/1993 | Matsuo | C22C 14/00 |
| | | | 420/419 |
| 10,208,360 B2 * | 2/2019 | Tetsui | C22F 1/04 |

(Continued)

FOREIGN PATENT DOCUMENTS

| | | |
|---|---|---|
| JP | H06049565 A | 2/1994 |
| JP | 2002356729 A | 12/2002 |

(Continued)

OTHER PUBLICATIONS

NPL: on-line translation of JP-2015004092-A, Jan. 2015 (Year: 2015).*

(Continued)

*Primary Examiner* — Jie Yang
(74) *Attorney, Agent, or Firm* — Hoffmann & Baron LLP (57) ABSTRACT

The present invention provides a TiAl-based alloy, including: Al: 41 to 43 at %; Fe: 0 to 2.5 at %; Ni: 0 to 2.5 at %; Mo: 0 to 2.0 at %; W: 0 to 2.0 at %; Cr: 0 to 4.5 at %; Mn: 0 to 5.5 at %; V: 0 to 10 at %; Nb: 0 to 10 at %; C: 0.3 to 0.7 at %; and a remainder consisting of Ti and inevitable impurities, in which an alloy element parameter "P=(41.5−Al)/3+Fe+Ni+Mo+W+0.5 Cr+0.4 Mn+0.2 V+0.2 Nb—C" is in a composition range of 1.1 to 1.9, and the TiAl-based alloy has a microstructure consisting of a γ phase of 5 to 30 area %, a β phase of 0.5 to 5 area %, and a lamellar structure occupying a remaining part.

5 Claims, 5 Drawing Sheets

(58) Field of Classification Search
USPC .......................................................... 420/418
See application file for complete search history.

(56) References Cited

U.S. PATENT DOCUMENTS

| | | |
|---|---|---|
| 2001/0022946 A1 | 9/2001 | Tetsui et al. |
| 2016/0145703 A1 | 5/2016 | Tetsui |

FOREIGN PATENT DOCUMENTS

| | | | | | |
|---|---|---|---|---|---|
| JP | 4209092 B | | 1/2009 | | |
| JP | 4287991 B | | 7/2009 | | |
| JP | 2015004092 A | * | 1/2015 | .............. | C21D 8/00 |
| JP | 2015151612 A | | 8/2015 | | |
| KR | 1020180068816 A | | 6/2018 | | |
| WO | 2014203714 A1 | | 12/2014 | | |

OTHER PUBLICATIONS

Lanzhou University of Technology University of Science and Technology Beijing, GAT(Gammalloys Technology)—2019, Jul. 21-26, 2019, Dunhuang, Gansu Province, China.
International Search Report corresponding to Application No. PCT/JP2019/048925 dated Mar. 17, 2020.

* cited by examiner

HOT-FORGED TIAL-BASED ALLOY, METHOD FOR PRODUCING SAME, AND USES FOR SAME

CROSS-REFERENCE TO RELATED APPLICATIONS

This application is the U.S. National Phase Application of International Application No. PCT/JP2019/048925, filed on Dec. 13, 2019, and asserts priority to Japanese Patent Application No. 2018-238989 filed on Dec. 21, 2018, all of which are hereby incorporated by reference in their entirety.

TECHNICAL FIELD

The present invention relates to a TiAl-based alloy suitable for utilization in a blade of a gas turbine for power generation, a jet engine for an aircraft, or the like, and particularly to a TiAl-based alloy with satisfactory hot forgeability, ductility at room temperature, and strength. Also, the present invention relates to a method for producing the TiAl-based alloy. The present invention relates to a blade for a turbine, a gas turbine for power generation, a jet engine for an aircraft, a supercharger for a ship, and a gas turbine and a steam turbine for industrial machines, which use the aforementioned TiAl-based alloy.

BACKGROUND ART

In recent years lightweight TiAl-based alloys with excellent heat resistance have attracted attention as a material used for blades of various turbines. In a case of large-sized blades, in particular, centrifugal stresses decrease as weights of blade materials decrease, and it is thus possible to increase the top reachable rotation frequencies and the areas of the blades and further to reduce load stresses on disks to which the blades are attached, which is significantly advantageous for enhancing the efficiency of the entire apparatuses.

A hot-forged material is one of the forms in which the TiAl-based alloys as lightweight heat-resistant alloys are used, and the present application is directed to the hot-forged material.

Patent Documents 1 and 2 propose that it is possible to eliminate casting defects and to use a synergistic effect of working strain and phase transformation to obtain a microstructure, by holding a TiAl-based alloy material with a predetermined composition in a dual-phase region of $\alpha+\beta$ phases and then performing plastic working thereon. Further, Patent Documents 1 and 2 assume that it is possible to produce a TiAl-based alloy with excellent machine workability and high-temperature strength by holding the hot-forged TiAl-based alloy material in an $\alpha+\beta$ phase region, an $\alpha+\beta+\gamma$ phase region, Or a $\beta+\gamma$ phase region to control area fractions of lamellar particles and the $\beta$ phase and particle sizes of the lamellar particles. As a hot working method other than the hot forging, Patent Documents 1 and 2 assume that extrusion, rolling, mold-forging, and the like can be used. However, since remaining of a certain amount of $\beta$ phase at room temperature is not avoidable according to the components of these documents, ductility at room temperature is estimated not to be that high.

Also, Patent Document 3 similarly assumes that so-called hot forging in which high-speed deformation is caused with a decrease in temperature during forging can be achieved by generating a $\beta$ phase with excellent high-temperature deformability through addition of $\beta$-stabilizing elements (Mn, V, Nb, Cr, and the like). Since a certain amount of $\beta$ phase remains in a final product similarly to Patent Documents 1 and 2, ductility at room temperature is estimated not to be that excellent.

Also, Patent Document 4 states that although hot forging is performed in the same $\alpha+\beta$ region as those of other documents, later heat treatment can be performed in an $\alpha$ region by adjusting components of a TiAl-based alloy. Patent Document 4 states that as a result, a complete lamellar structure with no $\beta$ phase is obtained after the heat treatment and creep strength is enhanced. However, since the alloy in Patent Document 4 has a slightly degraded hot forgeability, it is necessary to perform forging a total of seven times and re-heating before each forging until an ingot with a height of 90 mm reaches 15 mm as shown in Paragraph [0029] and FIG. 1 in the document, and there is a disclosure of a result showing that forgeability is not that excellent. Also, the TiAl-based hot-forged alloy in Patent Document 4 is not excellent in tensile properties at room temperature, but it is presumed that the ductility at room temperature is small because it has a completely lamellar structure and no $\gamma$ phase.

CITATION LIST

Patent Documents

[Patent Document 1]
Japanese Patent No. 4209092
[Patent Document 2]
Japanese Patent No. 4287991
[Patent Document 3]
Japanese Unexamined Patent Application, First Publication No. H6-49565
[Patent Document 4]
Japanese Unexamined Patent Application, First Publication No. 2015-151612

SUMMARY OF INVENTION

Technical Problem

The present invention solves the aforementioned problem in a TiAl-based hot-forged alloy, and an object thereof is to provide a TiAl-based alloy with excellent hot forgeability, ductility at room temperature, and strength.

Solution to Problem

A TiAl-based alloy according to an embodiment of the present invention is to solve the aforementioned problems and includes:
  Al: 41 to 43 at %;
  Fe: 0 to 2.5 at %;
  Ni: 0 to 2.5 at %;
  Mo: 0 to 2.0 at %;
  W: 0 to 2.0 at %;
  Cr: 0 to 4.5 at %;
  Mn: 0 to 5.5 at %;
  V: 0 to 10 at %;
  Nb: 0 to 10 at %;
  C: 0.3 to 0.7 at %;
  a remainder consisting of Ti and inevitable impurities, in which an alloy element parameter P obtained by Expression (1):

$$P=(41.5-Al)/3+Fe+Ni+Mo+W+0.5Cr+0.4Mn+0.2V+0.2Nb-C \qquad (1)$$

is in a composition range of 1.1 to 1.9, and the TiAl-based alloy has a microstructure consisting of a γ phase of 5 to 30 area %, a β phase of 0.5 to 5 area %, and a lamellar structure occupying a remaining part in a final state after heat treatment performed after hot forging.

A method for producing a TiAl-based alloy with the composition includes: creating an ingot through melting first and holding and hot-forging the ingot in a dual-phase region of α+β; and heat treating the hot-forged TiAl-based alloy material at a temperature of 1200° C. to 1250° C., a holding time of 0.5 to 5 h, and a cooling rate of 1 to 10° C./min to obtain the microstructure. The cooling temperature in the heat treatment above may be set up around room temperature as one example, but may be set up 800° C. which is temperature usually use of heat-treated TiAl-based alloy as way of example.

Preferably, in the cooling process in the heat treatment above, the precipitation of γ phase from β phase is promoted and an amount of β phase is reduced.

A blade for a turbine of the present invention is TiAl-based alloy having above composition, and TiAl-based alloy with above microstructure is used.

A gas turbine for power generation, a jet engine for an aircraft, a supercharger for a ship, or a gas turbine or a steam turbine for various industrial machines of the present invention are using the blade for a turbine above.

Next, features of each phase and a structure that are present in the TiAl-based hot-forged alloy and appropriate states of phases and a structure with which targeted properties can be obtained in the present application on the basis of the features will be described in advance as follows.

β phase (B2 phase): This is β in the form of a solid solution at a high temperature, exhibits high deformability at a high temperature, and thus significantly contributes to an improvement in forgeability at the time of hot forging. However, since this is regularized at room temperature and is transformed into a B2-type intermetallic compound, this does not contribute to ductility at room temperature and rather has an adverse effect such that the ductility at room temperature is degraded.

γ phase: This is softer than an α2 phase and the β (B2) phase at room temperature and thus has an effect of improving ductility at room temperature. Therefore, a certain quantity of γ phase is needed to secure ductility at room temperature to some extent. However, an excessively large amount of γ phase leads to a decrease in strength, which is unfavorable.

α (α2) phase: This is a phase that is α at a high temperature and is regularized and transformed into α2 at room temperature. The α2 phase is harder and stronger than the β (B2) and γ phases, and is thus a phase that contributes to an improvement in strength. However, if the amount thereof is too large, ductility is degraded. The α2 phase is mainly present in the lamellar structure at room temperature.

Lamellar structure: This is a structure in which the α2 phase and the γ phase are laminated in layers. This is a structure that contributes most to an improvement in strength at a high temperature, such as creep strength, and it is advantageous to employ a completely lamellar structure in a case of pursuing creep strength, which is different from the object of the present application. However, in such a case, a decrease in ductility at room temperature is unavoidable.

Next, reasons that the composition and the content of the TiAl-based alloy according to the present invention are limited to those described above will be described below. In the following description, % indicating the content represents at %.

Also, the β-phase stabilizing effect of Fe, Ni, Mo, W, Cr, Mn, V, and Nb as an effect of each additive element is known in the related art. The present inventor discovered, in addition to the above fact, that C promoted remarkably precipitation of γ phase from β phase, when γ phase is precipitating from β phase in the cooling process after the heat treatment.

This technical content is revealed for the first time in the present application.

Aluminum (Al): This is a basic configuration element of the TiAl-based alloy. 41.0 to 43.0 at % is a suitable range. In a case in which Al is less than 41.0 at %, the ratio of the α2 phase after the heat treatment excessively increases, and ductility at room temperature is thus degraded. In a case in which Al exceeds 43.0 at %, the amount of β phase becomes equal to or less than a necessary amount during the hot forging, and hot forgeability is thus degraded. The content of Al in the TiAl-based alloy according to the present invention is preferably 41.2 to 42.8 at % and is further preferably 41.4 to 42.6 at %.

Iron (Fe) is a β-stabilizing element and is added to improve the hot forgeability due to the effect of the β phase. A content of 2.5% or less is appropriate. In a case in which the content exceeds 2.5%, ductility at room temperature is degraded due to influences of Fe alone even if an alloy index is in the aforementioned range. The content of Fe in the TiAl-based alloy according to the present invention is preferably 2.0% or less and is further preferably 1.5% or less. Here, the alloy index refers to an alloy element parameter P:

$$P=(41.5-Al)/3+Fe+Ni+Mo+W+0.5Cr+0.4Mn+0.2V+0.2Nb-C \quad (2)$$

The aforementioned range refers to the range of the alloy element parameter P of 1.1 to 1.9.

Nickel (Ni) is a β-stabilizing element and is added to improve hot forgeability due to the effect of the β phase. A content of 2.5% or less is appropriate. In a case in which the content exceeds 2.5%, ductility at room temperature is degraded due to influences of Ni alone even if the alloy index is in the aforementioned range. The content of Ni in the TiAl-based alloy according to the present invention is preferably 2.0% or less and is further preferably 1.5% or less.

Molybdenum (Mo) is a β-stabilizing element and is added to improve hot forgeability due to the effect of the β phase. A content of 2.0% or less is appropriate. In a case in which the content exceeds 2.0%, ductility at room temperature is degraded due to influences of Mo alone even if the alloy indexes fall within the aforementioned range. The content of Mo in the TiAl-based alloy in the present invention is preferably 1.7 or less and is further preferably 1.5% or less.

Tungsten (W) is a β-stabilizing element and is added to improve hot forgeability due to the effect of the β phase. A content of 2.0% or less is appropriate. In a case in which the content exceeds 2.0%, ductility at room temperature is degraded due to influences of W alone even if the alloy index is in the aforementioned range. The content of W in the TiAl-based alloy in the present invention is preferably 1.7% or less and is further preferably 1.5% or less.

Chromium (Cr) is a β-stabilizing element and is added to improve hot forgeability due to the effect of the β phase. A content of 4.5% or less is appropriate. In a case in which the content exceeds 4.5%, ductility at room temperature is degraded due to influences of Cr alone even if the alloy index is in the aforementioned range. The content of Cr in the TiAl-based alloy in the present invention is preferably 4.0% or less and is further preferably 3.5% or less.

Manganese (Mn) is a β-stabilizing element and is added to improve hot forgeability due to the effect of the β phase. A content of 5.5% or less is appropriate. In a case in which the content exceeds 5.5%, ductility at room temperature is degraded due to influences of Mn alone even if the alloy index is in the aforementioned range. The content of Mn in the TiAl-based alloy according to the present invention is preferably 5.0% or less and is further preferably 4.5% or less.

Vanadium (V) is a β-stabilizing element and is added to improve hot forgeability due to the effect of the β phase. A content of 10.0% or less is appropriate. In a case in which the content exceeds 10.0%, ductility at room temperature is degraded due to influences of W alone even if the alloy index is in the aforementioned range. The content of V in the TiAl-based alloy in the present invention is preferably 8% or less and is further preferably 6% or less.

Niobium (Nb) is a β-stabilizing element and is added to improve hot forgeability due to the effect of the β phase. A content of 10.0% or less is appropriate. In a case in which the content exceeds 10.0%, ductility at room temperature is degraded due to influences of Nb alone even if the alloy index is in the aforementioned range. The content of Nb in the TiAl-based alloy according to the present invention is preferably 8% or less and is further preferably 6% or less.

Carbon (C) works to promote precipitation of γ phase from the β phase in the cooling process when the heat treatment after the forging. A content of 0.3 to 0.7% is appropriate. A content of 0.3% or less exhibits a lower promoting effect. In a case in which the content exceeds 0.7%, ductility at room temperature is degraded due to influences of C alone even if the alloy index is in the aforementioned range. The content of C in the TiAl-based alloy according to the present invention is preferably 0.35 to 0.65 at % and is further preferably 0.4 to 0.6 at %.

In the TiAl-based alloy according to the present invention, the alloy element parameter P represented by Equation (1) above preferably ranges from 1.1 to 1.9 at %. In a case in which the alloy element parameter P is less than 1.1 at %, the ratio of the β phase at the time of forging is below its target, and hot forgeability thus becomes poor. In a case in which the alloy element parameter P exceeds 1.9 at %, the remaining amount of β phase after the heat treatment increases over the suitable range regardless of the effect of adding carbon (C), and ductility at room temperature is thus degraded. The value of β in the TiAl-based alloy according to the present invention is preferably 1.2 to 1.8 at % and is further preferably 1.3 to 1.7 at %.

In the TiAl-based hot-forged alloy according to the present invention, a structure in which the area rate of the γ phase after heat treatment is 5 to 30%, the area rate of the β phase is 0.5 to 5 area %, and the remainder is a lamellar structure is preferably used since excellent ductility at room temperature and strength as targets of the present application can be achieved. Ductility at room temperature is degraded if the area rate of the γ phase is 5% or less, and strength at room temperature is degraded if the area rate is 30% or more. Hot forgeability is degraded if the area rate of the β phase is 0.5% or less, and ductility at room temperature is degraded if the area rate is 5% or more. Note that the area rate of the γ phase after the heat treatment in the TiAl-based alloy according to the present invention is preferably 7 to 25% and is further preferably 10 to 20%. Also, the area rate of the β phase is preferably 0.5 to 4.5% and is further preferably 0.5 to 4%.

In the TiAl-based hot-forged alloy according to the present invention, although three ranges, namely a wide range, a preferable range, and a further preferable range have been described in regard to the composition ratio of each of the composition elements Al, Fe, Ni, Mo, W, Cr, Mn, V, Nb, and C, numerical values of these three ranges may be arbitrarily combined.

An example of a combination of such composition elements in the TiAl-based hot-forged alloy of the present invention includes:

Al: 41.2 to 42.8 at %;
Fe: 0 to 2.0 at %;
Ni: 0 to 2.0 at %;
Mo: 0 to 1.7 at %;
W: 0 to 1.7 at %;
Cr: 0 to 4.0 at %;
Mn: 0 to 5.0 at %;
V: 0 to 8 at %;
Nb: 0 to 8 at %;
C: 0.35 to 0.65 at %; and
a remainder that is a TiAl-based alloy consisting of Ti and inevitable impurities, an alloy element parameter P is found by the following expression:

$$P=(41.5-Al)/3+Fe+Ni+Mo+W+0.5Cr+0.4Mn+0.2V+0.2Nb-C \qquad (3)$$

falling within a composition range of 1.2 to 1.8, and the TiAl-based hot-forged alloy has a microstructure including a γ phase of 7 to 25 area %, a β phase of 0.5 to 4.5 area %, and a remainder formed of a lamellar structure in a final state after the heat treatment performed after the hot forging.

Another example of a combination of such composition elements in the TiAl-based hot-forged alloy of the present invention includes:

Al: 41.4 to 42.6 at %;
Fe: 0 to 1.5 at %;
Ni: 0 to 1.5 at %;
Mo: 0 to 1.5 at %;
W: 0 to 1.5 at %;
Cr: 0 to 3.5 at %;
Mn: 0 to 4.5 at %;
V: 0 to 6 at %;
Nb: 0 to 6 at %;
C: 0.4 to 0.6 at %; and
a remainder that is a TiAl-based alloy consisting of Ti and inevitable impurities, an alloy element parameter P is found by the following expression:

$$P=(41.5-Al)/3+Fe+Ni+Mo+W+0.5Cr+0.4Mn+0.2V+0.2Nb-C$$

falling within a composition range of 1.3 to 1.7, and the TiAl-based hot-forged alloy has a microstructure including a γ phase of 10 to 20 area %, a β phase of 0.5 to 4 area %, and a remainder formed of a lamellar structure in a final state after heat treatment performed after hot forging.

Also, change processes of the phases and the structure at the time of forging and heat treatment performed thereafter on the TiAl-based hot-forged alloy are as follows.

At the time of hot forging: The hot forging is performed heating to a temperature to be an α+β dual-phase region.

Therefore, the dual phases, namely the α phase and the β phase are present in the materials.

A state cooled to room temperature after forging: Although the phases and the structure are substantially maintained at the time of the hot forging, the α phase is transformed and regularized to the α2 phase, and the β phase is transformed and regularized into the B2 phase.

At the time of holding a high temperature in heat treatment: The heat treatment of the TiAl-based forged alloy is performed at a temperature that is lower than the ordinary forging temperature. The phase region at the time of the heat treatment is a dual-phase region of α+β, or a single-phase region of α, or a triple-phase region of α+β+γ, and each of them is a phase configuration of the phase region. Note that although the dual-phase region of α+β is the same as the phase region at the time of the forging, the heat treatment temperature is lower than the forging temperature, and the ratio of the α phase increases while the ratio of the phase decreases.

Cooling process after heat treatment: The γ phase remains the same while the γ phase is precipitated from the α phase and the β phase in the cooling process. However, the α phase and the β phase are not completely transformed into the γ phase and partially remain. As a result, under room temperature after cooling, α phase at a high temperature becomes a lamellar structure of α2/γ and β phase at a high temperature becomes a dual-phase structure of β(B2)+γ.

In other words, in a final state at room temperature after the heat treatment, a structure in which the lamellar structure, the β phase, and the γ phase are present together in the case after the heat treatment in the dual-phase region of α+β, or the completely lamellar structure is obtained in a case after the heat treatment in the single-phase region of α. Also, in a case of heat treatment in the triple-phase region of α+β+γ, the structure becomes in which lamella structure, β phase, and γ phase mixed as in the case of after heat treatment of α+β dual-phase region, but ratio of γ phase increases.

In order to realize a TiAl-based hot-forged alloy with satisfactory hot forgeability, ductility at room temperature, and strength targeted by the present application using the aforementioned features of each phase and the structure and phase and structure change processes at the time of forging and heat treatment, the following measure is promising.

First, the hot forging is performed in the α+β region similarly to the TiAl-based hot-forged alloy in the related art. At that time, it is needless to say that a higher ratio of the β phase is more preferable to improve hot forgeability. On the other hand, to improve ductility at room temperature, it is necessary to perform heat treatment on the low-temperature side of α+β region or in α+β+γ region, and also to increase ratio of γ phase after cooling, and need to reduce ratio of β phase.

However, if the ratio of the γ phase excessively increases, the strength is degraded, and the ratio of the γ phase needs to be equal to or less than a certain amount. In addition, a certain amount of lamellar structure is needed to secure strength at room temperature. In other words, a structure including the γ phase and the β phase within certain ranges and including a remainder formed of a lamellar structure is preferably used in regard to the phases and the structure after the forging and the heat treatment.

Next, reasons that the heat treatment conditions for the forged material are limited as described above in the method for producing a TiAl-based alloy according to the present invention will be described below. The temperature range for holding the TiAl-based alloy material obtained by hot-forging in the heat treatment is 1200 to 1250° C. In a case in which the temperature is less than 1200° C., the area rate of the γ phase after cooling excessively increases, and the strength at room temperature is thus degraded. In a case in which the temperature exceeds 1250° C., the ratio of the β phase increases during the holding of the TiAl-based alloy, the β phase exceeding its target remains if the γ phase is precipitated from the β phase in the cooling process, and ductility at room temperature is thus degraded. The temperature is preferably 1205 to 1245° C. and is further preferably 1210 to 1240° C.

The holding time during the heat treatment is 0.5 to 5 hours. In a case in which the holding time is 0.5 hours or less, the time is too short, and the β phase that is present in the forged material does not decrease to the amount by which the β phase is equilibrated at the heat treatment temperature, the β phase exceeding the target thus remains even after the cooling, and ductility at room temperature is degraded. In a case in which the holding time exceeds 5 hours, the time is too long, the lamellar structure becomes coarse, and ductility at room temperature is thus degraded. The holding time is preferably 0.75 to 4 hours and is further preferably 1 to 3 hours.

The cooling rate is preferably 1 to 10 [° C./min]. In a case in which the cooling rate is less than 1 [° C./min], the cooling rate is too low, the lamellar structure is not sufficiently formed, and the strength is thus degraded. In a case in which the cooling rate is 10 [° C./min], the cooling rate is too high, they phase is insufficiently precipitated from the β phase, and the β phase exceeding the target remains even after cooling, and ductility at room temperature is degraded, which is unpreferable. The cooling rate is preferably 1.5 to 8 [° C./min] and is further preferably 2 to 6 [° C./min].

Advantageous Effects of Invention

According to the present invention, it is possible to provide a TiAl-based alloy with excellent hot forgeability by setting the alloy composition within the aforementioned component range and setting the alloy element parameter P represented by Equation (1) above within the range of 1.1 to 1.9 at %. Also, it is possible to promote precipitation of the γ phase from the phase that is present in large amount in the forged material in the cooling process in the heat treatment of the forged material due to the effect of carbon (C). As a result, it is possible to control the area rates of the γ phase, the β phase, and the lamellar structure within suitable ranges in the final materials and thereby to provide a TiAl-based forged alloy with excellent ductility and strength at room temperature.

DESCRIPTION OF EMBODIMENTS

Examples

Hereinafter, the present invention will be described using the drawings. First, details of a procedure for creating a TiAl-based hot-forged alloy according to the present invention and an evaluation test procedure will be described in order.

Procedure 1: Creation of Ingot

Figure 1:
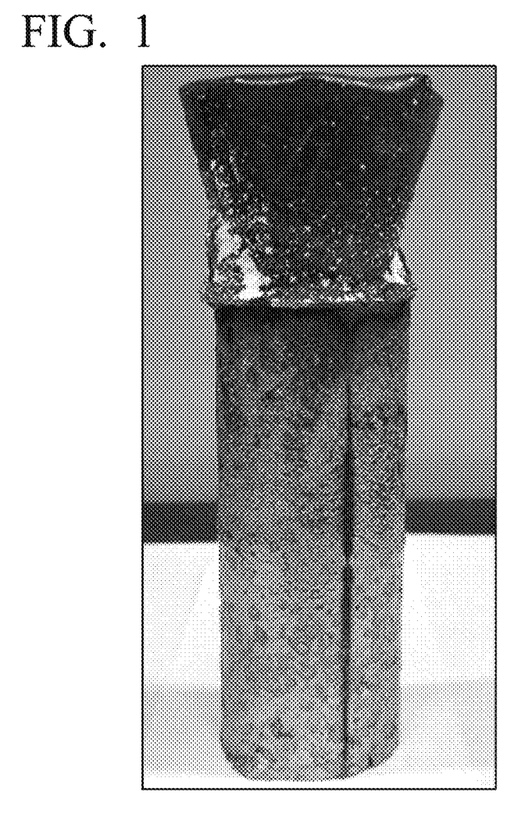
FIG. 1 is an appearance photograph explaining a TiAl alloy ingot used in examples of the present invention.

FIG. 1 is a representative example of appearances of ingots created to have alloy compositions (alloys 1 to 49) shown in Tables 1 and 2. All the ingots have substantially the same appearance (photograph). The method of manufacturing the ingot is high-frequency melting using an yttria crucible.

Raw materials of the ingot were sponge Ti and particulate raw materials of Al, Fe, Ni, Mo, W, Cr, Mn, V, and Nb. C was added in a state contained in TiC powder, and a total weight of the ingot was about 850 g. The dissolution atmosphere was in argon gas. Casting was performed using a casting mold made of casting iron with an inner diameter of Φ50 mm, feeding head was cut, and the lower side (a portion with a uniform thickness) was used for a hot-forging test. The height of the ingot material during the hot-forging test was about 100 mm.

Procedure 2: Hot-Forging Test

Figure 2:
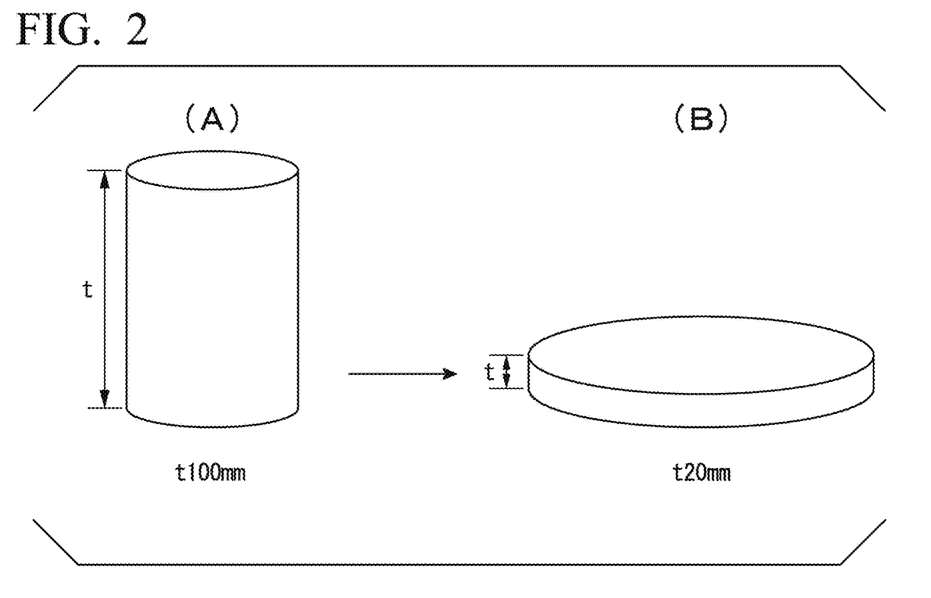
FIG. 2 is an explanatory diagram of a hot-forging test conducted to evaluate hot forgeability, where (A) shows a sample shape before the hot forging and (B) shows a sample shape after the hot forging.
Figure 3:
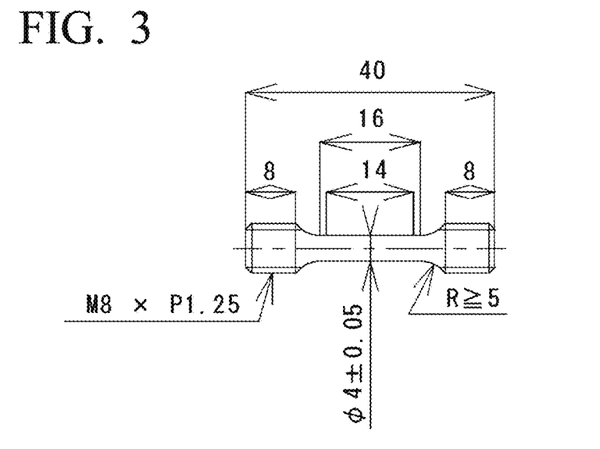
FIG. 3 is a dimensional diagram of a tensile test piece in accordance with JISZ2241.

The hot-forging test was conducted as in the explanatory diagram shown in FIG. 2. FIG. 2 is an explanatory diagram of the hot-forging test conducted to evaluate hot forgeability, where (A) shows a sample shape before the hot forging and (B) shows a sample shape after the hot forging. In other words, the forging was conducted by setting the heating temperature to 1350° C., taking the ingot out of the furnace, placing the ingot in a press, and then lowering the press. The lowering speed of the press was 50 mm/second or more, and the forging direction was an upset direction. The number of times the forging was performed was once, and the ingot material with a height t of 100 mm at the first forging was compressed to 20 mm (see (A) and (B) of FIG. 2).

Figure 4A:
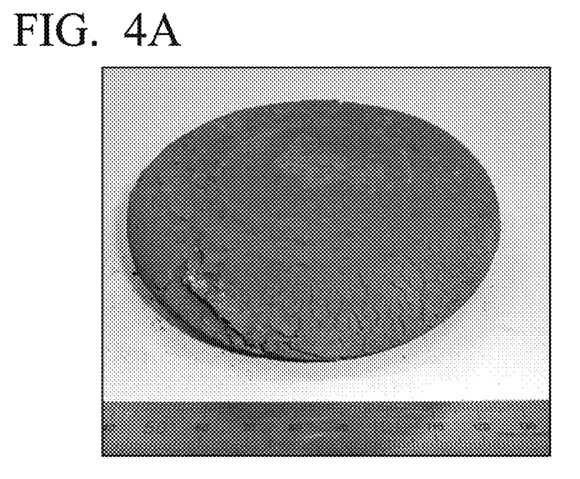
FIG. 4A shows a comparative alloy (alloy number 28) of the present invention.
Figure 4B:
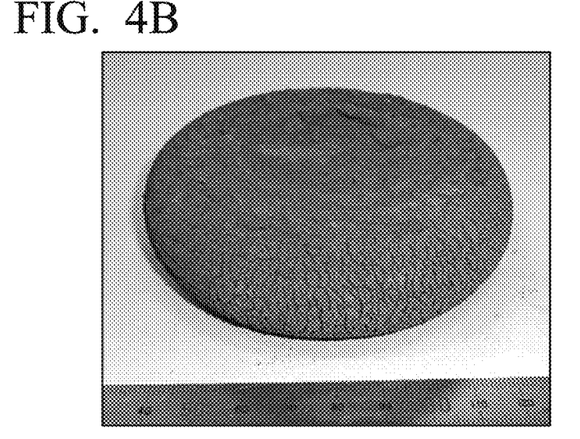
FIG. 4B shows an example alloy (alloy number 32) of the present invention.

FIGS. 4A and 4B are appearance photographs in a case in which the TiAl alloys used in the examples of the present invention were heated to 1350° C. and were hot forged. FIG. 4A shows a comparative alloy (alloy number 28), and FIG. 4B shows an example alloy (alloy number 32).

Procedure 3: Investigation of Suitable Heat Treatment Conditions

A heat treatment test was conducted on the hot-forged material after the aforementioned procedure 2 with the holding temperature, the holding time, and the cooling (temperature dropping) speed changed, and suitable heat treatment conditions were investigated through structure observation.

As a result, for the alloy according to the present invention, that is, the TiAl hot-forged alloy with the alloy element parameter P represented by Equation (1) described above to fall within a range of 1.1 to 1.9 at %, the holding temperature was preferably 1200 to 1250° C. was ascertained. Also, a preferable holding time of 0.5 to 5 hours and a preferable cooling rate of 1 to 10 [° C./min] was ascertained.

Note that the structure determined to be suitable in the investigation of the heat treatment conditions was a structure in which the area rate of the γ phase was 5 to 30%, the area rate of the β phase was 0.5 to 5 area %, and the remainder was a lamellar structure.

Figure 5A:
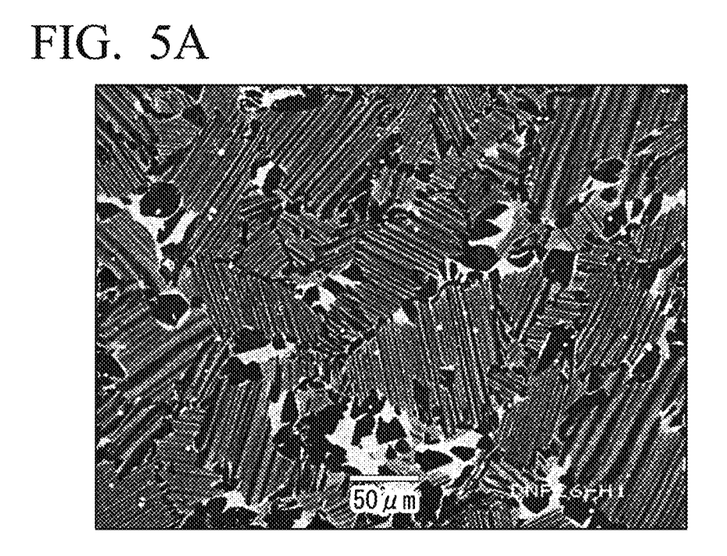
FIG. 5A shows a comparative alloy (alloy number 37) of the present invention.
Figure 5B:
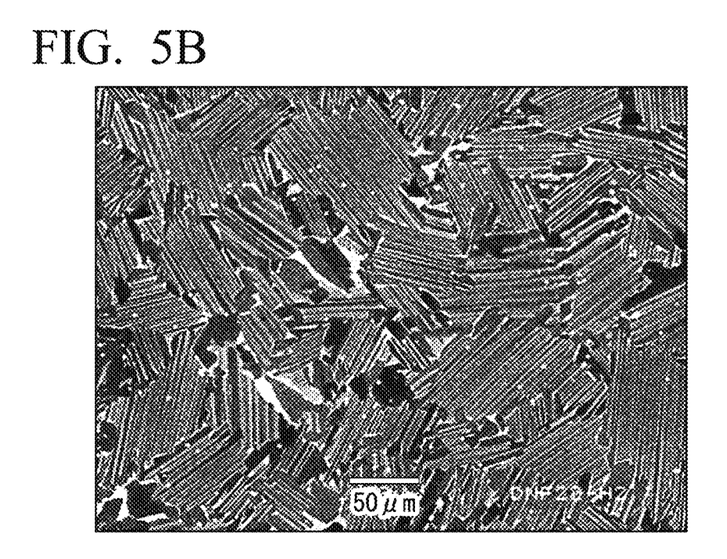
FIG. 5B shows an example alloy (alloy number 33) of the present invention.

FIGS. 5A and 5B show reflected electron images of the microstructures after the heat treatment of the TiAl hot-forged alloy used in the example of the present invention, where FIG. 5A shows a comparative alloy (alloy number 37) and FIG. 5B shows an example alloy (alloy number 33).

Figure 6:
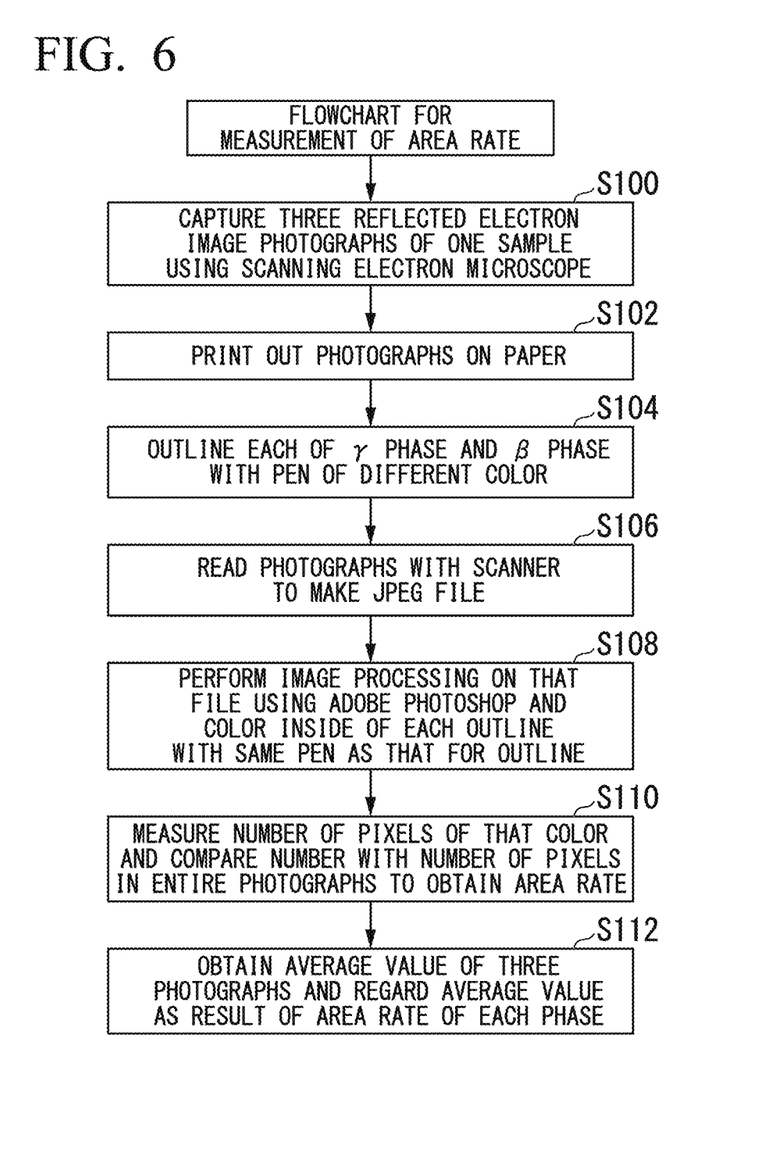
FIG. 6 shows a flowchart of area rate measurement.
Figure 7A:
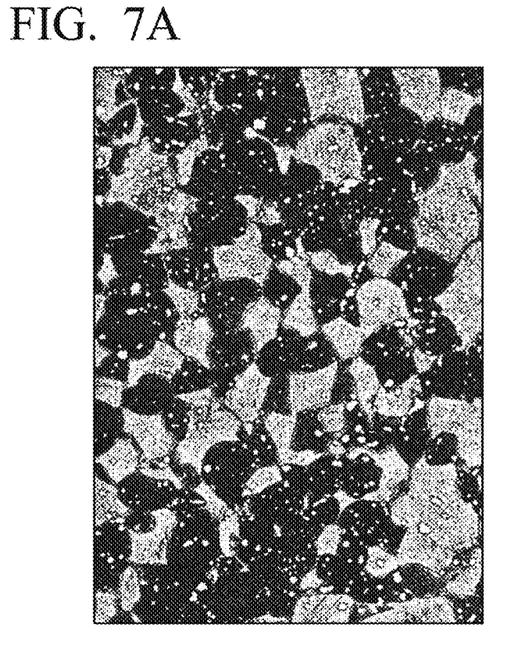
FIG. 7A shows a SEM image of an alloy structure in the area rate measurement in S104 in FIG. 6.
Figure 7B:
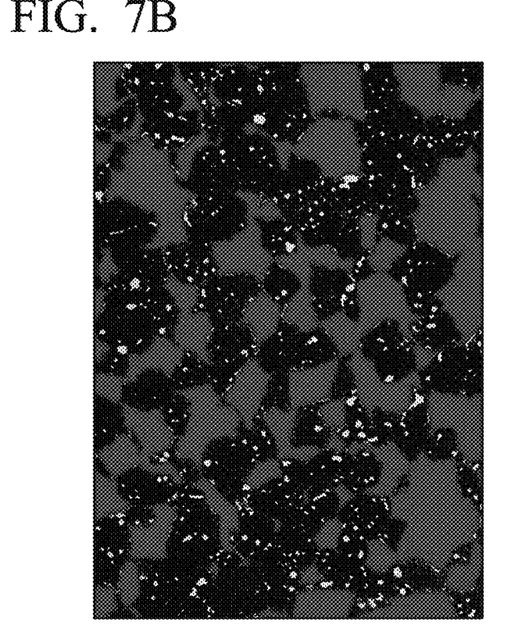
FIG. 7B shows a SEM image of the alloy structure in the area rate measurement in S108 in FIG. 6.

FIG. 6 shows a flowchart of measurement of an area rate. FIGS. 7A and 7B are explanatory diagrams of a treatment process performed on an SEM image of an alloy structure in measurement of an area rate, where FIG. 7A shows S104 in FIG. 6 and FIG. 7B shows S108 in FIG. 6.

In the flowchart of the measurement of the area rate, a statistically meaningful number, for example, three reflected electron image photographs were taken for one sample using a scanning electron microscope first (S100). Next, the three reflected electron image photographs imaged were then printed out on paper (S102). Then, γ phases and β phases in the microstructure of the TiAl hot-forged alloys in the reflected electron image photographs were outlined with pens of different colors (S104). The outlined reflected electron image photographs were read by a scanner and were converted into image files such as PEG files, for example (S106). Then, image processing was performed on the image files using image software such as, for example, Adobe Photoshop (registered trademark) manufactured by Adobe Systems Incorporated to color the inside of the outlines with the same colors as the pens used for the outlines (S108). Then, the numbers of pixels of the colors were measured and were then compared with the numbers of pixels of the entire photographs, thereby obtaining the area rates (S110). Finally, average values of the three photographs were obtained and regarded as results of the area rates of the γ phase and the β phase (S112).

Note that although the measurement of the area rate was conducted by printing out the images of the scanning electron microscope on paper once, manually converting the printed images into the image files, and performing the image processing thereon in the aforementioned area rate measurement, such image-processing arithmetic operations may be performed by an image-processing system using a computer program to perform image processing.

Procedure 4: Room Temperature Tensile Test.

Next, heat treatment under suitable conditions was performed on the hot-forged material, and a tensile test was conducted. The tensile test was conducted in accordance with JISZ2241, and in regard to the shape of the tensile test piece, a cylindrical rod test piece with an entire length of 40 mm, with a length of 8 mm at gripped portions at both ends, with a length of 16 mm at the center portion, and with a diameter of Φ4 mm, as shown in FIGS. 4A and 4B, was used. The tested material was worked into the shape of a cylindrical rod test piece, and a tensile test at room temperature was conducted thereon to measure elongation and strength. As criteria for determining results as being good or bad in regard to the elongation at room temperature, results of less than 0.5% were determined to be bad while results of 0.5% or more were determined to be good. Also, in regard to the strength at room temperature, strength of less than 550 MPa was determined to be bad while strength of 550 MPa or more was determined to be good.

In the examples of the invention of the present application as described above, targeted properties were as follows. In other words, the targeted property of the hot forgeability was that no cracking occurred in the material even if the ingot with the height of 100 mm was forged to 20 mm in one compression as shown in FIG. 2. As for material properties after the heat treatment, a target ductility at room temperature was 0.5% or more, and a target strength at room temperature was 550 MPa or more.

Hereinafter, results of performing hot forging and heat treatment on ingots created to have the compositions in Tables 1 and 2 and evaluating the products in the aforementioned procedure will be described for each of the alloys 1 to 48.

TABLE 1

| Alloy | Category | Component (at %) | | | | | | | | | | Alloy index P (Predetermined equation) |
|---|---|---|---|---|---|---|---|---|---|---|---|---|
| | | Al | Fe | Ni | Mo | W | Cr | Mn | V | Nb | C | |
| Alloy 1 | Comparative alloy | 40.5 | 0.8 | | | | | 2.0 | | | 0.5 | 1.43 |
| Alloy 2 | Example alloy | 41.0 | | 0.2 | | 0.2 | 1.0 | 2.0 | | | 0.5 | 1.37 |
| Alloy 3 | Example alloy | 42.0 | 0.3 | | 0.3 | | | | 3.0 | 5.0 | 0.5 | 1.53 |
| Alloy 4 | Example alloy | 43.0 | | | | | 1.0 | 5.0 | | | 0.5 | 1.50 |
| Alloy 5 | Comparative alloy | 43.5 | | 0.5 | | 0.5 | 1.0 | | 2.0 | 4.0 | 0.5 | 1.53 |
| Alloy 6 | Example alloy | 42.0 | 2.4 | | | | | | | | 0.5 | 1.73 |
| Alloy 7 | Comparative alloy | 42.0 | 2.6 | | | | | | | | 0.5 | 1.93 |
| Alloy 8 | Example alloy | 42.0 | | 2.4 | | | | | | | 0.5 | 1.73 |
| Alloy 9 | Comparative alloy | 42.0 | | 2.6 | | | | | | | 0.5 | 1.93 |
| Alloy 10 | Example alloy | 42.0 | | | 1.9 | | | | | | 0.5 | 1.23 |
| Alloy 11 | Comparative alloy | 42.0 | | | 2.1 | | | | | | 0.5 | 1.43 |
| Alloy 12 | Example alloy | 42.0 | | | | 1.9 | | | | | 0.5 | 1.23 |
| Alloy 13 | Comparative alloy | 42.0 | | | | 2.1 | | | | | 0.5 | 1.43 |
| Alloy 14 | Example alloy | 42.0 | | | | | 4.0 | | | | 0.5 | 1.33 |
| Alloy 15 | Comparative alloy | 42.0 | | | | | 5.0 | | | | 0.5 | 1.83 |
| Alloy 16 | Example alloy | 42.0 | | | | | | 5.0 | | | 0.5 | 1.33 |
| Alloy 17 | Comparative alloy | 42.0 | | | | | | 6.0 | | | 0.5 | 1.73 |
| Alloy 18 | Example alloy | 42.0 | | | | | | | 9.0 | | 0.5 | 1.13 |
| Alloy 19 | Comparative alloy | 42.0 | | | | | | | 11.0 | | 0.5 | 1.53 |
| Alloy 21 | Example alloy | 42.0 | | | | | | | | 9.0 | 0.5 | 1.13 |
| Alloy 22 | Comparative alloy | 42.0 | | | | | | | | 11.0 | 0.5 | 1.53 |
| Alloy 23 | Comparative alloy | 42.0 | | | | | 1.0 | 4.0 | | | 0.2 | 1.73 |
| Alloy 24 | Example alloy | 42.0 | | | | | 1.0 | 4.0 | | | 0.3 | 1.63 |
| Alloy 25 | Example alloy | 42.0 | | | | | 1.0 | 4.0 | | | 0.5 | 1.43 |

| Alloy | Result of forging test at 1350° C.) | Heat treatment conditions for forged material | | | Area rate of each phase after heat treatment (%) | | Result of tensile test at room temperature | |
|---|---|---|---|---|---|---|---|---|
| | | Temperature (° C.) | Time (h) | Cooling rate (° C./min) | γ phase | β phase | Elongation (%) | Strength (MPa) |
| Alloy 1 | No Cracking | 1220 | 2.0 | 2.5 | 13.3 | 3.3 | 0.4 | 643 |
| Alloy 2 | No Cracking | 1220 | 2.0 | 2.5 | 14.3 | 3.2 | 0.6 | 605 |
| Alloy 3 | No Cracking | 1220 | 2.0 | 2.5 | 17.5 | 4.2 | 1.0 | 584 |
| Alloy 4 | No Cracking | 1220 | 2.0 | 2.5 | 15.7 | 4.3 | 0.8 | 561 |
| Alloy 5 | Cracking occurred | | | | | | | |
| Alloy 6 | No Cracking | 1220 | 2.0 | 2.5 | 21.3 | 3.8 | 0.5 | 578 |
| Alloy 7 | No Cracking | 1220 | 2.0 | 2.5 | 27.6 | 4.8 | 0.4 | 603 |
| Alloy 8 | No Cracking | 1220 | 2.0 | 2.5 | 19.5 | 3.5 | 0.6 | 574 |
| Alloy 9 | No Cracking | 1220 | 2.0 | 2.5 | 23.1 | 4.7 | 0.3 | 602 |
| Alloy 10 | No Cracking | 1220 | 2.0 | 2.5 | 10.0 | 4.0 | 0.5 | 587 |
| Alloy 11 | No Cracking | 1220 | 2.0 | 2.5 | 14.4 | 4.5 | 0.4 | 624 |
| Alloy 12 | No Cracking | 1220 | 2.0 | 2.5 | 9.6 | 2.7 | 0.6 | 589 |
| Alloy 13 | No Cracking | 1220 | 2.0 | 2.5 | 17.5 | 4.3 | 0.3 | 641 |
| Alloy 14 | No Cracking | 1220 | 2.0 | 2.5 | 12.4 | 2.5 | 0.6 | 565 |
| Alloy 15 | No Cracking | 1220 | 2.0 | 2.5 | 26.1 | 4.8 | 0.4 | 572 |
| Alloy 16 | No Cracking | 1220 | 2.0 | 2.5 | 10.4 | 2.5 | 0.5 | 557 |
| Alloy 17 | No Cracking | 1220 | 2.0 | 2.5 | 21.4 | 3.8 | 0.4 | 578 |
| Alloy 18 | No Cracking | 1220 | 2.0 | 2.5 | 9.5 | 1.5 | 0.6 | 601 |
| Alloy 19 | No Cracking | 1220 | 2.0 | 2.5 | 17.8 | 3.8 | 0.3 | 643 |
| Alloy 21 | No Cracking | 1220 | 2.0 | 2.5 | 13.5 | 1.0 | 0.7 | 623 |
| Alloy 22 | No Cracking | 1220 | 2.0 | 2.5 | 18.7 | 3.0 | 0.3 | 656 |
| Alloy 23 | No Cracking | 1220 | 2.0 | 2.5 | 25.8 | 5.8 | 0.4 | 576 |
| Alloy 24 | No Cracking | 1220 | 2.0 | 2.5 | 22.0 | 4.7 | 0.6 | 567 |
| Alloy 25 | No Cracking | 1220 | 2.0 | 2.5 | 13.2 | 3.5 | 1.1 | 590 |

TABLE 2

| Alloy | Category | Component (at %) | | | | | | | | | | Alloy index P (Predetermined equation) |
|---|---|---|---|---|---|---|---|---|---|---|---|---|
| | | Al | Fe | Ni | Mo | W | Cr | Mn | V | Nb | C | |
| Alloy 26 | Example alloy | 42.0 | | | | | 1.5 | 4.0 | | | 0.7 | 1.48 |
| Alloy 27 | Comparative alloy | 42.0 | | | | | 2.0 | 4.0 | | | 0.8 | 1.63 |
| Alloy 28 | Comparative alloy | 42.0 | 0.5 | | | | | 3.0 | | | 0.5 | 1.03 |
| Alloy 29 | Example alloy | 42.0 | | 0.3 | | 0.3 | 1.0 | 1.7 | | | 0.5 | 1.11 |
| Alloy 30 | Example alloy | 41.5 | | | 0.4 | | | | 3.0 | 6.0 | 0.4 | 1.80 |
| Alloy 31 | Example alloy | 42.0 | 0.6 | | | | 0.5 | 2.0 | 2.0 | | 0.5 | 1.38 |
| Alloy 32 | Example alloy | 42.5 | | | | 0.6 | | 2.0 | | 5.0 | 0.6 | 1.47 |
| Alloy 33 | Example alloy | 43.0 | 0.5 | 0.4 | | | 1.0 | 3.0 | | | 0.7 | 1.40 |
| Alloy 34 | Example alloy | 42.5 | | | 0.5 | 0.4 | | | 3.0 | 5.0 | 0.4 | 1.77 |
| Alloy 35 | Example alloy | 41.5 | | | | | 2.0 | 2.0 | | | 0.3 | 1.50 |
| Alloy 36 | Example alloy | 42.0 | 0.4 | | | 0.4 | 1.0 | 2.0 | 2.0 | | 0.5 | 1.83 |
| Alloy 37 | Comparative alloy | 42.0 | | | | | 2.0 | 4.0 | | | 0.5 | 1.93 |
| Alloy 38 | Comparative alloy | 42.0 | | | | | 1.0 | 4.0 | | | 0.5 | 1.43 |
| Alloy 39 | Example alloy | 42.0 | | | | | 1.0 | 4.0 | | | 0.5 | 1.43 |
| Alloy 40 | Example alloy | 42.0 | | | | | 1.0 | 4.0 | | | 0.5 | 1.43 |
| Alloy 41 | Comparative alloy | 42.0 | | | | | 1.0 | 4.0 | | | 0.5 | 1.43 |
| Alloy 42 | Comparative alloy | 42.0 | | | | | 1.0 | 4.0 | | | 0.5 | 1.43 |
| Alloy 43 | Example alloy | 42.0 | | | | | 1.0 | 4.0 | | | 0.5 | 1.43 |
| Alloy 44 | Example alloy | 42.0 | | | | | 1.0 | 4.0 | | | 0.5 | 1.43 |
| Alloy 45 | Comparative alloy | 42.0 | | | | | 1.0 | 4.0 | | | 0.5 | 1.43 |
| Alloy 46 | Example alloy | 42.0 | | | | | 1.0 | 4.0 | | | 0.5 | 1.43 |
| Alloy 47 | Example alloy | 42.0 | | | | | 1.0 | 4.0 | | | 0.5 | 1.43 |
| Alloy 48 | Comparative alloy | 42.0 | | | | | 1.0 | 4.0 | | | 0.5 | 1.43 |

| Alloy | Result of forging test at 1350° C.) | Heat treatment conditions for forged material | | | Area rate of each phase after heat treatment (%) | | Result of tensile test at room temperature | |
|---|---|---|---|---|---|---|---|---|
| | | Temperature (° C.) | Time (h) | Cooling rate (° C./min) | γ phase | β phase | Elongation (%) | Strength (MPa) |
| Alloy 26 | No cracking | 1220 | 2.0 | 2.5 | 16.2 | 3.0 | 0.6 | 630 |
| Alloy 27 | No cracking | 1220 | 2.0 | 2.5 | 25.0 | 1.7 | 0.3 | 664 |
| Alloy 28 | Cracking occurred | | | | | | | |
| Alloy 29 | No cracking | 1220 | 2.0 | 2.5 | 5.5 | 1.0 | 0.7 | 670 |
| Alloy 30 | No cracking | 1220 | 2.0 | 2.5 | 25.4 | 4.7 | 0.9 | 579 |
| Alloy 31 | No cracking | 1220 | 2.0 | 2.5 | 12.7 | 1.5 | 1.3 | 612 |
| Alloy 32 | No cracking | 1220 | 2.0 | 2.5 | 15.7 | 2.7 | 1.2 | 590 |
| Alloy 33 | No cracking | 1220 | 2.0 | 2.5 | 8.1 | 3.3 | 0.9 | 624 |
| Alloy 34 | No cracking | 1220 | 2.0 | 2.5 | 26.4 | 4.3 | 1.1 | 567 |
| Alloy 35 | No cracking | 1220 | 2.0 | 2.5 | 16.8 | 3.2 | 0.8 | 597 |
| Alloy 36 | No cracking | 1220 | 2.0 | 2.5 | 24.9 | 4.8 | 0.5 | 585 |
| Alloy 37 | No cracking | 1220 | 2.0 | 2.5 | 27.9 | 5.5 | 0.4 | 569 |
| Alloy 38 | No cracking | 1190 | 2.0 | 2.5 | 32.6 | 3.5 | 1.6 | 530 |
| Alloy 39 | No cracking | 1200 | 2.0 | 2.5 | 14.8 | 1.8 | 1.4 | 578 |
| Alloy 40 | No cracking | 1250 | 2.0 | 2.5 | 12.0 | 4.7 | 0.6 | 606 |
| Alloy 41 | No cracking | 1260 | 2.0 | 2.5 | 10.8 | 5.8 | 0.4 | 642 |
| Alloy 42 | No cracking | 1220 | 0.4 | 2.5 | 10.7 | 6.0 | 0.4 | 597 |
| Alloy 43 | No cracking | 1220 | 0.5 | 2.5 | 11.8 | 4.8 | 0.6 | 620 |
| Alloy 44 | No cracking | 1220 | 5.0 | 2.5 | 15.7 | 1.0 | 0.5 | 612 |
| Alloy 45 | No cracking | 1220 | 6.0 | 2.5 | 16.3 | 0.3 | 0.3 | 634 |
| Alloy 46 | No cracking | 1220 | 2.0 | 1.0 | 15.7 | 1.0 | 1.4 | 589 |
| Alloy 47 | No cracking | 1220 | 2.0 | 10.0 | 12.2 | 4.5 | 0.6 | 623 |
| Alloy 48 | No cracking | 1220 | 2.0 | 12.0 | 11.0 | 5.7 | 0.4 | 634 |

Alloy 1 (comparative alloy): Al was less than the composition range of the examples. Since the amount of the α2 phase was excessively large, elongation at room temperature was 0.4%, which was below the determination criteria and was determined to be bad.

Alloys 2, 3, and 4 (example alloys): Al fell within the composition range of the examples. Satisfactory hot forgeability and elongation and strength at room temperature were achieved.

Alloy 5 (comparative alloy): Al exceeded the composition range of the examples. The amount of β phase during the forging was small, hot forgeability was bad, and for example, cracking occurred during the hot forging. Note that the following evaluation was not conducted on this sample.

Alloy 6 (example alloy): Fe fell within the composition range of the examples. Satisfactory hot forgeability and elongation and strength at room temperature were achieved.

Alloy 7 (comparative alloy): Fe exceeded the composition range of the examples. The elongation at room temperature was 0.4%, which was below the determination criteria and was determined to be bad.

Alloy 8 (example alloy): Ni fell within the composition range of the examples. Satisfactory hot forgeability and elongation and strength at room temperature were achieved.

Alloy 9 (comparative alloy): Ni exceeded the composition range of the examples. Elongation at room temperature was 0.3%, which was below the determination criteria and was determined to be bad.

Alloy 10 (example alloy): Mo fell within the composition range of the examples. Satisfactory hot forgeability and elongation and strength at room temperature were achieved.

Alloy 11 (comparative alloy): Mo exceeded the composition range of the examples. The elongation at room temperature was 0.4%, which was below the determination criteria and was determined to be bad.

Alloy 12 (example alloy): W fell within the composition range of the examples. Satisfactory hot forgeability and elongation and strength at room temperature were achieved.

Alloy 13 (comparative alloy): W exceeded the composition range of the examples. Elongation at room temperature was 0.3%, which was below the determination criteria and was determined to be bad.

Alloy 14 (example alloy): Cr fell within the composition range of the examples. Satisfactory hot forgeability and elongation and strength at room temperature were achieved.

Alloy 15 (comparative alloy): Cr exceeded the composition range of the examples. The elongation at room temperature was 0.4%, which was below the determination criteria and was determined to be bad.

Alloy 16 (example alloy): Mn fell within the composition range of the examples. Satisfactory hot forgeability and elongation and strength at room temperature were achieved.

Alloy 17 (comparative alloy): Mn exceeded the composition range of the examples. The elongation at room temperature was 0.4%, which was below the determination criteria and was determined to be bad.

Alloy 18 (example alloy) V fell within the composition range of the examples. Satisfactory hot forgeability and elongation and strength at room temperature were achieved.

Alloy 19 (comparative alloy): V exceeded the composition range of the examples. Elongation at room temperature was 0.3%, which was below the determination criteria and was determined to be bad. Note that the alloy 20 was a missing number.

Alloy 21 (example alloy): Nb fell within the composition range of the examples. Satisfactory hot forgeability and elongation and strength at room temperature were achieved.

Alloy 22 (comparative alloy): Nb exceeded the composition range of the examples. Elongation at room temperature was 0.3%, which was below the determination criteria and was determined to be bad.

Alloy 23 (comparative alloy): C was less than the composition range of the examples. Since the amount of $\gamma$ phase precipitated from the $\beta$ phase in the cooling process was small and more $\beta$ phase remained than the target amount, elongation at room temperature was 0.4%, which was below the determination criteria and was determined to be bad.

Alloys 24, 25, and 26 (example alloys): C fell within the composition range of the examples. Satisfactory hot forgeability and elongation and strength at room temperature were achieved.

Alloy 27 (comparative alloy): C exceeded the composition range of the examples. Elongation at room temperature was 0.3%, which was below the determination criteria and was determined to be bad.

Alloy 28 (comparative alloy): The alloy index was smaller than the composition range of the examples. The amount of $\beta$ phase during the forging was small, hot forgeability was bad, and for example, cracking occurred during the hot forging. Note that the following evaluation was not conducted on this sample.

Alloys 29, 30, 31, 32, 33, 34, 35, and 36 (example alloys): The alloy indexes fell within the composition range of the examples. Satisfactory hot forgeability and elongation and strength at room temperature were achieved.

Alloy 37 (comparative alloy): The alloy index exceeded the composition range of the examples. Since more $\beta$ phase remained than the target amount, elongation at room temperature was 0.4%, which was below the determination criteria and was determined to be bad.

Alloy 38 (comparative alloy): The heat treatment temperature was lower than the specified range of the examples. Since the amount of $\gamma$ phase was larger than the target amount, strength at room temperature was 530 MPa which was below the determination criteria and was determined to be bad.

Alloys 39 and 40 (example alloys): The heat treatment temperatures fell within the specified range of the examples. Satisfactory hot forgeability and elongation and strength at room temperature were achieved.

Alloy 41 (comparative alloy): The heat treatment temperature was higher than the specified range of the examples. Since more $\beta$ phase remained than the target amount, elongation at room temperature was 0.4%, which was below the determination criteria and was determined to be bad.

Alloy 42 (comparative alloy): The heat treatment time was shorter than the specified range of the examples. Since the $\beta$ phase in the forged material did not decrease to the amount by which the $\beta$ phase was equilibrated at the temperature and more $\beta$ phase after the heat treatment remained than the target amount, elongation at room temperature was 0.4%, which was below the determination criteria and was determined to be bad.

Alloys 43 and 44 (example alloys): The heat treatment times fell within the specified range of the examples. Satisfactory hot forgeability and elongation and strength at room temperature were achieved.

Alloy 45 (comparative alloy): The heat treatment time was longer than the specified range of the examples. Since the lamellar structure became coarse after long-term holding, elongation at room temperature was 0.3%, which was below the determination criteria and was determined to be bad.

Alloys 46 and 47 (example alloys): The cooling rates fell within the specified range of the examples. Satisfactory hot forgeability and elongation and strength at room temperature were achieved.

Alloy 48 (comparative alloy): The cooling rate fell faster than the specified range of the examples. Since the cooling rate was too fast, the amount of $\gamma$ phase precipitated from the $\beta$ phase was small, and more $\beta$ phase remained than the target amount, elongation at room temperature was 0.4%, which was below the determination criteria and was determined to be bad.

INDUSTRIAL APPLICABILITY

As described in detail above, the TiAl-based alloy according to the present invention has excellent hot forgeability and ductility and strength at room temperature and is thus suitable for TiAl-based alloy material as a blade for a turbine, for example.

Also, the blade for a turbine is suitably used as a gas turbine for power generation, a jet engine for an aircraft, a supercharger for a ship, or a gas turbine or a steam turbine for various industrial machines.

What is claimed is:

1. A method for producing a TiAl-based alloy, the method comprising:
   a step of hot-forging a TiAl-based alloy base material as the temperature of the TiAl-based alloy base material is held in a coexistence temperature range of an α phase and a β phase; and
   a heat treating step of holding the TiAl-based alloy material obtained by hot-forging in a temperature range of 1205 to 1245° C. for 0.5 to 5 hours and then cooling the TiAl-based alloy material at a cooling rate of 1 to 10° C./min,
   wherein the TiAl-based alloy base material subjected to the step of hot-forging comprises:
   Al: 41 to 43 at %;
   Fe: 0 to 2.5 at %;
   Ni: 0 to 2.5 at %;
   Mo: 0 to 2.0 at %;
   W: 0 to 2.0 at %;
   Cr: 0 to 4.5 at %;
   Mn: 0 to 5.5 at %;
   V: 0 to 10 at %;
   Nb: 0 to 10 at %;
   C: 0.3 to 0.7 at %; and
   a remainder consisting of Ti and inevitable impurities,
   an alloy element parameter P obtained by Equation (1) below is in a range of 1.1 to 1.9, $$P=(41.5-Al)/3+Fe+Ni+Mo+W+0.5Cr+0.4Mn+0.2V+0.2Nb-C \quad (1), \text{ and}$$

the produced TiAl-based alloy has a microstructure consisting of a γ phase of 5 to 30 area %, a β phase of 0.5 to 5 area %, and a lamellar structure occupying a remaining part.

2. The method for producing a TiAl-based alloy according to claim 1, wherein in a cooling process in the heat treating step, a γ phase is precipitated from the β phase and an amount of the β phase is reduced.

3. The method for producing a TiAl-based alloy according to claim 1, wherein the hot-forging is performed at 1210 to 1240° C. for 0.75 to 4 hours in the heat treating step.

4. A method for producing a TiAl-based alloy, the method comprising:
   a step of hot-forging a TiAl-based alloy base material as the temperature of the TiAl-based alloy base material is held in a coexistence temperature range of an α phase and a β phase; and
   a heat treating step of holding the TiAl-based alloy material obtained by hot-forging in a temperature range of 1210 to 1240° C. for 0.75 to 4 hours and then cooling the TiAl-based alloy material at a cooling rate of 1.5 to 8° C./min,
   wherein the TiAl-based alloy base material subjected to the step of hot-forging comprises:
   Al: 41.2 to 42.8 at %;
   Fe: 0 to 2.0 at %;
   Ni: 0 to 2.0 at %;
   Mo: 0 to 1.7 at %;
   W: 0 to 1.7 at %;
   Cr: 0 to 4.0 at %;
   Mn: 0 to 5.0 at %;
   V: 0 to 8 at %;
   Nb: 0 to 8 at %;
   C: 0.35 to 0.65 at %; and
   a remainder consisting of Ti and inevitable impurities,
   an alloy element parameter P obtained by Equation (1) below is in a range of 1.2 to 1.8, $$P=(41.5-Al)/3+Fe+Ni+Mo+W+0.5Cr+0.4Mn+0.2V+0.2Nb-C \quad (1), \text{ and}$$

the produced TiAl-based alloy has a microstructure consisting of a γ phase of 7 to 25 area %, a β phase of 0.5 to 4.5 area %, and a lamellar structure occupying a remaining part.

5. A method for producing a TiAl-based alloy, the method comprising:
   a step of hot-forging a TiAl-based alloy base material as the temperature of the TiAl-based alloy base material is held in a coexistence temperature range of an α phase and a β phase; and
   a heat treating step of holding the TiAl-based alloy material obtained by hot-forging in a temperature range of 1210 to 1240° C. for 1 to 3 hours and then cooling the TiAl-based alloy material at a cooling rate of 2 to 6° C./min,
   wherein the TiAl-based alloy base material subjected to the step of hot-forging comprises:
   Al: 41.2 to 42.8 at %;
   Fe: 0 to 2.0 at %;
   Ni: 0 to 2.0 at %;
   Mo: 0 to 1.7 at %;
   W: 0 to 1.7 at %;
   Cr: 0 to 4.0 at %;
   Mn: 0 to 5.0 at %;
   V: 0 to 8 at %;
   Nb: 0 to 8 at %;
   C: 0.35 to 0.65 at %; and
   a remainder consisting of Ti and inevitable impurities,
   an alloy element parameter P obtained by Equation (1) below is in a range of 1.2 to 1.8, $$P=(41.5-Al)/3+Fe+Ni+Mo+W+0.5Cr+0.4Mn+0.2V+0.2Nb-C \quad (1), \text{ and}$$

the produced TiAl-based alloy has a microstructure consisting of a γ phase of 10 to 20 area %, a β phase of 0.5 to 4.0 area %, and a lamellar structure occupying a remaining part.

* * * * *

UNITED STATES PATENT AND TRADEMARK OFFICE
CERTIFICATE OF CORRECTION

PATENT NO. : 11,920,219 B2
APPLICATION NO. : 17/311866
DATED : March 5, 2024
INVENTOR(S) : Toshimitsu Tetsui et al.

Page 1 of 1

It is certified that error appears in the above-identified patent and that said Letters Patent is hereby corrected as shown below:

In the Specification

Column 4, Line 15:
Now reads: "the amount of 13 phase"
Should read: --the amount of β phase--

Column 8, Line 23:
Now reads: "they phase is insufficiently"
Should read: --the γ phase is insufficiently--

Signed and Sealed this
Thirtieth Day of September, 2025

John A. Squires
*Director of the United States Patent and Trademark Office*